US012583997B2

(12) United States Patent
Hamada et al.

(10) Patent No.: US 12,583,997 B2
(45) Date of Patent: **\*Mar. 24, 2026**

(54) RESIN MOLDED BODY AND RESIN MOLDED BODY PRODUCTION METHOD

(71) Applicant: Mitsubishi Chemical Corporation, Tokyo (JP)

(72) Inventors: Yujiro Hamada, Tokyo (JP); Yudai Motomatsu, Tokyo (JP); Masahiko Ono, Tokyo (JP)

(73) Assignee: Mitsubishi Chemical Corporation, Tokyo (JP)

( \* ) Notice: Subject to any disclaimer, the term of this patent is extended or adjusted under 35 U.S.C. 154(b) by 800 days.

This patent is subject to a terminal disclaimer.

(21) Appl. No.: 17/660,934

(22) Filed: Apr. 27, 2022

(65) Prior Publication Data

US 2022/0251337 A1 Aug. 11, 2022

Related U.S. Application Data

(63) Continuation of application No. PCT/JP2020/046250, filed on Dec. 11, 2020.

(30) Foreign Application Priority Data

Dec. 12, 2019 (JP) ................................. 2019-224164
Mar. 16, 2020 (JM) .............................. 2020-044909
(Continued)

(51) Int. Cl.
*C08K 5/20* (2006.01)
*B29C 45/00* (2006.01)
(Continued)

(52) U.S. Cl.
CPC ............ *C08K 5/20* (2013.01); *B29C 45/0001* (2013.01); *B29C 45/62* (2013.01); *B29C 45/78* (2013.01);
(Continued)

(58) Field of Classification Search
CPC ....... C08K 5/20; B29C 45/0001; B29C 45/62; B29C 45/78; C08F 120/14
See application file for complete search history.

(56) References Cited

U.S. PATENT DOCUMENTS 5,155,190 A \* 10/1992 Okinaka .................. G02B 1/04
526/203
2002/0084545 A1 7/2002 Doi et al.
(Continued)

FOREIGN PATENT DOCUMENTS

CN 106905649 A 6/2017
CN 107250261 A 10/2017
(Continued)

OTHER PUBLICATIONS

English machine translation of JP 2009-209298A. (Year: 2009).\*
(Continued)

*Primary Examiner* — John E Uselding
(74) *Attorney, Agent, or Firm* — Oblon, McClelland, Maier & Neustadt, L.L.P.

(57) ABSTRACT

Provided is a resin molded product having excellent scratch resistance. The resin molded product of the present invention is a resin molded product including a methacrylic-based resin composition, in which the methacrylic-based resin composition contains a (meth)acrylic-based polymer (A) and a fatty acid compound (B), and an absorbance ratio P1/P2 of a peak absorbance P1 in a wave number range of 1630 to 1650 $cm^{-1}$ to a peak absorbance P2 in a wave number range of 1710 to 1730 $cm^{-1}$ on a surface of the resin molded product, measured by a single reflection ATR surface reflection method with an infrared spectrophotometer, is 0.0040 or more.

12 Claims, 2 Drawing Sheets

(30) Foreign Application Priority Data

Oct. 30, 2020 (JP) ................................ 2020-182982
Nov. 5, 2020 (JP) ................................ 2020-185151

(51) Int. Cl.

| | |
|---|---|
| B29C 45/62 | (2006.01) |
| B29C 45/78 | (2006.01) |
| C08F 120/14 | (2006.01) |
| B29K 233/04 | (2006.01) |

(52) U.S. Cl.

CPC .... *C08F 120/14* (2013.01); *B29C 2945/7604* (2013.01); *B29K 2233/12* (2013.01)

(56) References Cited

U.S. PATENT DOCUMENTS

| | | |
|---|---|---|
| 2005/0019584 A1 | 1/2005 | Tsuda et al. |
| 2021/0102056 A1 | 4/2021 | Komurasaki et al. |

FOREIGN PATENT DOCUMENTS

| | | | | |
|---|---|---|---|---|
| JP | 5-279538 A | 10/1993 | | |
| JP | 10-007866 A | 1/1998 | | |
| JP | 10-128921 A | 5/1998 | | |
| JP | 2001-26691 A | 1/2001 | | |
| JP | 2003-327772 A | 11/2003 | | |
| JP | 2005-042066 A | 2/2005 | | |
| JP | 2009209298 A | * 9/2009 | ............. | C08L 45/00 |
| JP | 2013-189655 A | 9/2013 | | |
| JP | 2015-131948 A | 7/2015 | | |
| JP | 2016-132743 A | 7/2016 | | |
| JP | 2016-169283 A | 9/2016 | | |
| JP | 6597785 B2 | 10/2019 | | |
| JP | 2019-199602 A | 11/2019 | | |
| JP | 2020-19942 A | 2/2020 | | |
| JP | 2020-19944 A | 2/2020 | | |
| WO | WO 2018/016473 A1 | 1/2018 | | |
| WO | WO 2018/142164 A1 | 8/2018 | | |
| WO | WO 2018/173435 A1 | 9/2018 | | |
| WO | WO 2018/230336 A1 | 12/2018 | | |

OTHER PUBLICATIONS

Rex Plastics. The Plastic Injection Molding Process. Feb. 13, 2020. (Year: 2020).*

International Search Report issued Feb. 9, 2021 in PCT/JP2020/046327 filed Dec. 11, 2020, 5 pages (with English Translation).

International Search Report issued Mar. 2, 2021 in PCT/JP2020/046250 filed Dec. 11, 2020, 7 pages (with English Translation).

Office Action issued Jul. 22, 2023, in corresponding Chinese Patent Application No. 202080085434.X (with English Translation), 14 pages.

Combined Chinese Office Action and Search Report issued on Feb. 22, 2023 in Chinese Patent Application No. 202080085434.X (with English translation), 17 pages.

Office Action issued Oct. 8, 2024, in corresponding Japanese Patent Application No. 2020-571000 (with English Translation), 14 pages.

Office Action mailed Sep. 11, 2024 in co-pending U.S. Appl. No. 17/839,435, 11 pages.

Extended European Search Report issued Jan. 4, 2023 in European Patent Application No. 20899158.8, 7 pages.

Korean Office Action issued Apr. 26, 2024 in Korean Patent Application No. 10-2022-7018889 (with unedited computer-generated English translation), 14 pages.

Office Action issued Feb. 18, 2025, in U.S. Appl. No. 17/839,435, 14 pages.

Office Action issued Aug. 25, 2025 in related U.S. Appl. No. 17/839,435, 15 pages.

Wayken, "PMMA Injection Molding Service", Wayken Rapid Manufacturing, Jan. 22, 2019, 12 pages.

* cited by examiner

TD DIRECTION

MD DIRECTION

RESIN MOLDED BODY AND RESIN MOLDED BODY PRODUCTION METHOD

TECHNICAL FIELD

The present invention relates to a resin molded product and a method of producing a resin molded product.

This application is a continuation application of International Application No. PCT/JP 2020/046250, filed on Dec. 11, 2020, which claims the benefit of priority of the prior Japanese Patent Application No. 2019-224164 filed on Dec. 12, 2019, Japanese Patent Application No. 2020-044909 filed on Mar. 16, 2020, Japanese Patent Application No. 2020-182982 filed on Oct. 30, 2020, and Japanese Patent Application No. 2020-185151 filed on Nov. 5, 2020, the contents of which are incorporated herein by reference.

BACKGROUND ART

Due to its excellent appearance, scratch resistance, and chemical resistance, methacrylic-based resins are widely used in applications as materials for housing equipment such as vanities, bathtubs, and flush toilets; building materials; and vehicle members such as vehicle interior and exterior materials.

In a case where a methacrylic-based resin product is used for the above purposes, the product may be scratched due to contact with people or objects. Therefore, there is a demand for a resin molded product made of a methacrylic-based resin composition and having more excellent scratch resistance.

As a method for solving such a problem, for example, an acrylic-based resin composition containing a fatty acid amide is disclosed in Patent Document 1.

An acrylic-based resin composition containing a fatty acid amide and an impact resistance modifier is disclosed in Patent Document 2.

An acrylic resin composition for a vehicle exterior member, which contains a fatty acid amide compound is disclosed in Patent Document 3.

CITATION LIST

Patent Documents

[Patent Document 1]
PCT International Publication No. WO 2018/142164
[Patent Document 2]
Japanese Unexamined Patent Application, First Publication No. 2018-134801
[Patent Document 3]
Japanese Unexamined Patent Application, First Publication No. 2018-134854

SUMMARY OF INVENTION

Technical Problem

However, the methacrylic-based resin compositions disclosed in Patent Documents 1 to 3 have insufficient scratch resistance.

An object of the present invention is to provide a resin molded product that contains a methacrylic-based resin composition and that has excellent scratch resistance.

Solution to Problem

The present invention has the following aspects.

[1] A resin molded product including a methacrylic-based resin composition, in which the methacrylic-based resin composition contains a (meth)acrylic-based polymer (A) and a fatty acid compound (B), and an absorbance ratio P1/P2 of a peak absorbance P1 in a wave number range of 1630 to 1650 cm$^{-1}$ to a peak absorbance P2 in a wave number range of 1710 to 1730 cm$^{-1}$ on a surface of the resin molded product, measured by a single reflection ATR surface reflection method with an infrared spectrophotometer, is 0.0040 or more.

[2] The resin molded product according to [1], in which the fatty acid compound (B) is represented by General Formula (i), $$R-CONH_2 \qquad (i)$$

in Formula, R is a hydrocarbon group having 10 to 25 carbon atoms which may have a substituent.

[3] The resin molded product according to [1] or [2], in which a dynamic friction coefficient of the surface of the resin molded product is 0.12 or less.

[4] The resin molded product according to any one of [1] to [3], in which a water contact angle of the surface of the resin molded product is 69.0 degrees or higher.

[5] The resin molded product according to any one of [1] to [4], in which a 10% weight-reduction temperature of the fatty acid compound (B) is 308° C. or lower.

[6] The resin molded product according to any one of [1] to [5], in which the fatty acid compound (B) has a melting point of 90° C. or higher.

[7] The resin molded product according to any one of [1] to [6], in which the fatty acid compound (B) is a fatty acid amide compound (B1).

[8] The resin molded product according to [7], in which the fatty acid amide compound (B1) is a saturated fatty acid amide compound.

[9] The resin molded product according to [8], in which the saturated fatty acid amide compound contains stearic acid amide and palmitic acid amide as main components.

[10] The resin molded product according to any one of [1] to [9], in which a content ratio of the fatty acid compound (B) is 0.01% by mass or more and 10% by mass or less with respect to 100% by mass of a total mass of the methacrylic-based resin composition.

[11] The resin molded product according to any one of [1] to [10], in which a solubility parameter of the fatty acid compound (B) is 11.0 (cal/cm$^3$)$^{1/2}$ or less.

[12] The resin molded product according to any one of [1] to [11], in which a content of a repeating unit derived from methyl methacrylate in the (meth)acrylic-based polymer (A) is 70% by mass or more.

[13] The resin molded product according to any one of [1] to [12], in which the methacrylic-based resin composition does not contain a compound containing a fluorine atom.

[14] The resin molded product according to any one of [1] to [13], in which the resin molded product is used as a raw material for a vehicle member or a mobile phone member.

[15] The resin molded product according to [14], in which the resin molded product is used as a vehicle member, and the vehicle member is at least one selected from a tail lamp cover, a headlamp cover, and a meter panel.

[16] The resin molded product according to [14], in which the resin molded product is used as a mobile phone member, and the mobile phone member is a back plate of a mobile phone.

[17] A method of producing a resin molded product obtained by performing injection molding on a methacrylic-based resin composition containing a (meth)acrylic-based polymer (A) and a fatty acid compound (B), in which in the injection molding, the (meth)acrylic-based resin composition is injected from an injection molding machine with a cylinder temperature of 248° C. or higher and 300° C. or lower into a metal mold.

[18] The method of producing a resin molded product according to [17], in which the cylinder temperature of the injection molding machine is 248° C. or higher and 295° C. or lower.

[19] The method of producing a resin molded product according to [17], in which the cylinder temperature of the injection molding machine is 265° C. or higher and 290° C. or lower.

[20] The method of producing a resin molded product according to any one of [17] to [19], in which the methacrylic-based resin composition is injected into the metal mold whose metal mold temperature is set in advance to 35° C. or higher and 90° C. or lower.

[21] The method of producing a resin molded product according to any one of [17] to [19], in which the methacrylic-based resin composition is injected into the metal mold whose metal mold temperature is set in advance to 36° C. or higher and 70° C. or lower.

[22] The method of producing a resin molded product according to any one of [17] to [19], in which the methacrylic-based resin composition is injected into the metal mold whose metal mold temperature is set in advance to 37° C. or higher and 50° C. or lower.

[23] The method of producing a resin molded product according to any one of [17] to [22], in which in the injection molding, an injection speed is 30 cm³/sec or less.

[24] The method of producing a resin molded product according to any one of [17] to [22], in which in the injection molding, an injection speed is 12 cm³/sec or less.

[25] The method of producing a resin molded product according to any one of [17] to [22], in which in the injection molding, an injection speed is 8 cm³/sec or less.

[26] The method of producing a resin molded product according to any one of [17] to [22], in which in the injection molding, an injection speed is 5 cm³/sec or less.

[27] The method of producing a resin molded product according to any one of [17] to [26], in which a 10% weight-reduction temperature of the fatty acid compound (B) is 308° C. or lower.

[28] The method of producing a resin molded product according to any one of [17] to [27], in which the fatty acid compound (B) has a melting point of 90° C. or higher.

[29] The method of producing a resin molded product according to any one of [17] to [28], in which the resin molded product is produced so that an absorbance ratio P1/P2 of a peak absorbance P1 in a wave number range of 1630 to 1650 cm⁻¹ to a peak absorbance P2 in a wave number range of 1710 to 1730 cm⁻¹ on a surface of the resin molded product, measured by a single reflection ATR surface reflection method with an infrared spectrophotometer, is 0.0040 or more.

Advantageous Effects of Invention

The resin molded product of the present invention has excellent scratch resistance.

The methacrylic-based resin composition of the present invention is excellent in scratch resistance of the resin molded product obtained by the methacrylic-based resin composition of the present invention being molded.

Due to its excellent scratch resistance, the resin molded product of the present invention can be suitably used as, for example, a mobile phone member such as a back plate of a mobile phone; a material for housing equipment such as vanities, bathtubs, and flush toilets; building materials; vehicle members such as vehicle interior/exterior materials such as a tail lamp cover, a headlamp cover, and a meter panel; or raw materials thereof.

DESCRIPTION OF EMBODIMENTS

Figure 1:
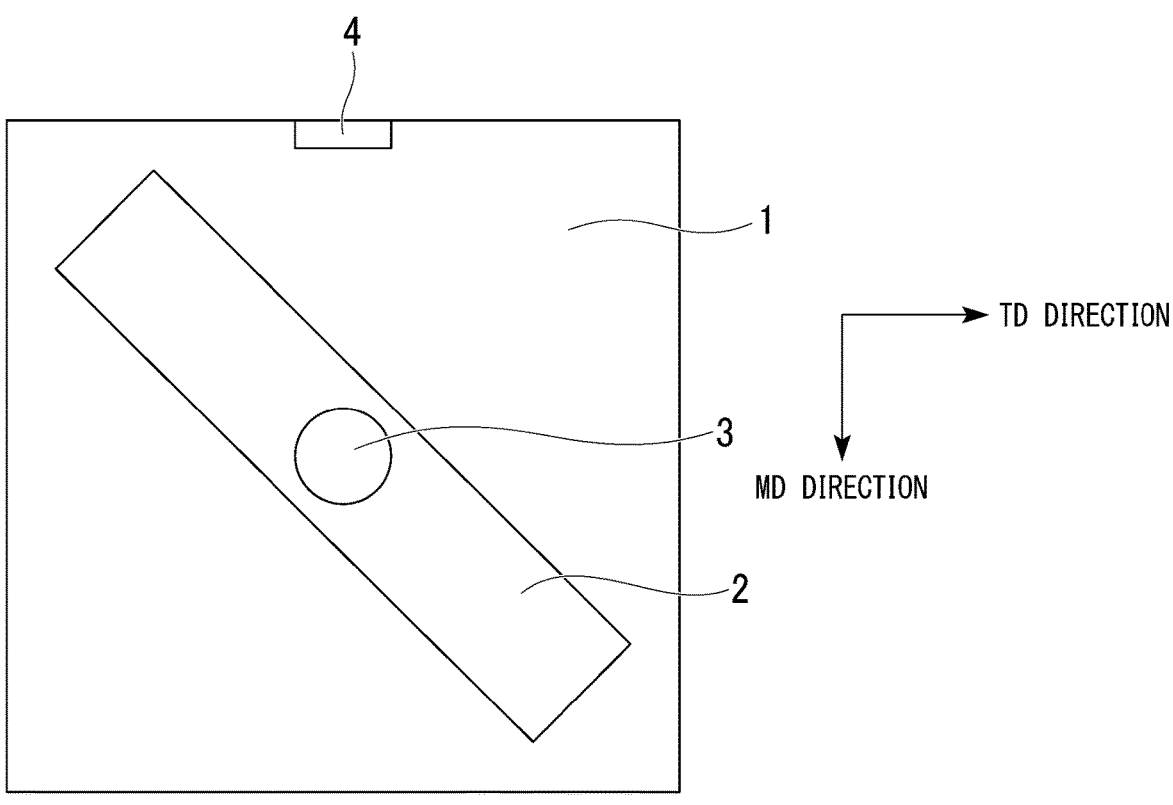
FIG. 1 is a schematic diagram showing an outline of a scratch resistance test used for an evaluation of a resin molded product of the present invention.

In the present specification, "(meth)acrylate" means at least one selected from "acrylate" and "methacrylate", and "(meth)acrylic acid" means at least one selected from "acrylic acid" and "methacrylic acid".

In the present specification, a "monomer" means an unpolymerized compound, and a "repeating unit" means a unit formed by the polymerization of a monomer and derived from the monomer. The repeating unit may be a unit directly formed by a polymerization reaction, or may be a unit of which a part is converted into another structure through treatment of a polymer.

In the present specification, "% by mass" indicates a content ratio of a predetermined component contained in 100% by mass of the total amount.

In the present specification, the "obtained resin molded product" means a molded product obtained by the methacrylic-based resin composition of the present invention being molded.

<Resin Molded Product>

The resin molded product of the present invention is a resin molded product obtained by a methacrylic-based resin composition described later being molded.

In the resin molded product of the present invention, an absorbance ratio P1/P2 of a peak absorbance P1 in a wave number range of 1630 to 1650 cm⁻¹ to a peak absorbance P2 in a wave number range of 1710 to 1730 cm⁻¹ on a surface of the resin molded product, measured by a single reflection ATR surface reflection method with an infrared spectrophotometer, is 0.0040 or more. As a result, the scratch resistance of the obtained resin molded product is extremely excellent.

In the present invention, the peak absorbance refers to an absorbance at the peak top in a peak including the corresponding wave number.

The absorbance ratio P1/P2 is an index showing a content ratio of a fatty acid compound (B) on a surface of the resin molded product and in the vicinity of the surface, and it is shown that as P1/P2 is large, the fatty acid compound (B) is present in a high content ratio on the surface of the resin molded product and in the vicinity of the surface.

In a case where the lower limit of P1/P2 is 0.0040 or more, the fatty acid compound (B) is present in a high content ratio on the surface of the resin molded product and in the vicinity of the surface. Therefore, the friction coefficient on the surface of the resin molded product is sufficiently reduced, thereby achieving the resin molded product with excellent scratch resistance. Furthermore, since the favorable scratch resistance of the obtained resin molded product can be achieved without increasing the content of the fatty acid compound (B), it is less prone to impair the original performance of a (meth)acrylic resin, which includes transparency, heat resistance, and weather resistance, for example. P1/P2 is preferably 0.0045 or more, and more preferably 0.0060 or more. On the other hand, the upper limit of P1/P2 is not particularly limited, but the upper limit of P1/P2 is preferably 0.02 or less. In a case where P1/P2 is 0.02 or less, the content ratio of the fatty acid compound (B) does not reach too high a value on the surface of the resin molded product and in the vicinity of the surface, and the mechanical strength of the resin molded product does not easily decrease, thereby capable of achieving the sufficiently favorable scratch resistance of the resin molded product.

The upper limit and lower limit of P1/P2 can be optionally combined. For example, 0.0040 or more and 0.02 or less is preferable, 0.0045 or more and 0.02 or less is more preferable, and 0.0060 or more and 0.02 or less is still more preferable.

As a specific method of measuring P1/P2 in the present specification, methods described in Examples can be applied.

The values of P1/P2 can be controlled by the adjustment of conditions of a cylinder temperature, a metal mold temperature, and furthermore an injection speed of an injection molding machine during injection molding in a method of producing a resin molded product of the present invention described later. The specific method will be described later.

In the resin molded product of the present invention, a dynamic friction coefficient of the surface of the resin molded product is preferably 0.12 or less.

The dynamic friction coefficient on the surface of the resin molded product is an index showing a content ratio of the fatty acid compound (B) on the surface of the resin molded product and in the vicinity of the surface, and it is shown that as a value of the dynamic friction coefficient is small, the fatty acid compound (B) is present in a high content ratio on the surface of the resin molded product and in the vicinity of the surface.

In a case where the upper limit of the dynamic friction coefficient is 0.12 or less, the obtained resin molded product is excellent in scratch resistance. The upper limit of the dynamic friction coefficient is more preferably 0.10 or less. The lower limit of the dynamic friction coefficient is not particularly limited, and as the lower limit is small, the obtained resin molded product is excellent in scratch resistance.

As a specific method of measuring the dynamic friction coefficient of the resin molded product in the present specification, methods described in Examples can be applied.

The values of the dynamic friction coefficient can be controlled by the adjustment of conditions of a cylinder temperature, a metal mold temperature, and an injection speed of an injection molding machine during injection molding in a method of producing a resin molded product of the present invention described later. The specific method will be described later.

The resin molded product of the present invention preferably has a water contact angle of 69.0 degrees or higher on the surface of the resin molded product.

The water contact angle on the surface of the resin molded product is an index showing a content ratio of the fatty acid compound (B) on the surface of the resin molded product and in the vicinity of the surface, and it is shown that as a value of the water contact angle is large, the fatty acid compound (B) is present in a high content ratio on the surface of the resin molded product and in the vicinity of the surface.

In a case where the lower limit of the water contact angle is 69.0 degrees or higher, the fatty acid compound (B) is present in a high content ratio on the surface of the resin molded product and in the vicinity of the surface, so that the obtained resin molded product is excellent in scratch resistance. The water contact angle is more preferably 72 degrees or higher, and still more preferably 75 degrees or higher. The upper limit of the water contact angle is not particularly limited, and as the upper limit is large, the obtained resin molded product is excellent in scratch resistance.

As a specific method of measuring the water contact angle of the resin molded product in the present specification, methods described in Examples can be applied.

The values of the water contact angle can be controlled by the adjustment of conditions of a cylinder temperature, a metal mold temperature, and an injection speed of an injection molding machine during injection molding in a method of producing a resin molded product of the present invention described later. The specific method will be described later.

In the resin molded product of the present invention, it is preferable that the methacrylic-based resin composition does not include a compound containing a fluorine atom.

In a case where the methacrylic-based resin composition does not include a compound containing a fluorine atom, it is possible to avoid causing coloring or alteration of the obtained resin molded product by a fluorine atom or hydrogen fluoride generated by thermal decomposition of the compound containing a fluorine atom in a case where the cylinder temperature is raised during injection molding, and the methacrylic-based resin composition does not include the compound containing a fluorine atom, thereby capable of suppressing coloring or alteration of the obtained resin molded product.

The resin molded product of the present invention also preferably does not include a compound containing a fluorine atom.

Examples of the compound containing a fluorine atom include known olefin-based polymers containing a fluorine atom in the related art. Specific examples thereof include a homopolymer of vinylidene fluoride; a vinylidene fluoride-based copolymer containing a repeating unit derived from a vinylidene fluoride monomer and a repeating unit derived from a monomer copolymerizable with vinylidene fluoride.

<Methacrylic-Based Resin Composition>

The methacrylic-based resin composition is a material for forming the resin molded product of the present invention and contains a (meth)acrylic-based polymer (A) described later and the fatty acid compound (B) described later.

Since the methacrylic-based resin composition contains the fatty acid compound (B), the obtained resin molded product is excellent in scratch resistance.

Since the methacrylic-based resin composition contains the (meth)acrylic-based polymer (A) and the fatty acid compound (B), the resin molded product of the present invention including the methacrylic-based resin composition is excellent in scratch resistance. Furthermore, the transparency of the obtained resin molded product can be favorably maintained.

<(Meth)Acrylic-Based Polymer (A)>

The (meth)acrylic-based polymer (A) is one of components of the methacrylic-based resin composition for forming the resin molded product of the present invention.

Since the methacrylic-based resin composition contains the (meth)acrylic-based polymer (A), the transparency of the obtained resin molded product can be improved, the thermal decomposition of the resin molded product can be suppressed, and weather resistance and moldability can be favorable.

The (meth)acrylic-based polymer (A) more preferably contains a repeating unit derived from methyl methacrylate (hereinafter referred to as a "methyl methacrylate unit") in an amount of 70% by mass or more with respect to 100% by mass of the total mass of the (meth)acrylic-based polymer (A).

Examples of the (meth)acrylic-based polymer (A) in the present invention include a methyl methacrylate homopolymer and a methyl methacrylate copolymer in which the content ratio of the methyl methacrylate unit in the (meth)acrylic-based polymer (A) is 70% by mass or more and less than 100% by mass (hereinafter, these are collectively also referred to as a "polymer (A1)").

<Polymer (A1)>

The polymer (A1) is a homopolymer of methyl methacrylate or a methyl methacrylate copolymer containing a methyl methacrylate unit of 70% by mass or more and less than 100% by mass and a repeating unit derived from other monomers (hereinafter, referred to as the "other monomer unit") copolymerizable with methyl methacrylate of more than 0% by mass and 30% by mass or less.

From the viewpoint that the original performance of the (meth)acrylic resin is not impaired, among the polymers (A1), a copolymer in which a content ratio of a methyl methacrylate unit contained in the polymer (A1) is 90% by mass or more and less than 100% by mass, or methyl methacrylate homopolymer is preferable, and a copolymer in which a content ratio of a methyl methacrylate unit contained in the polymer (A1) is 95% by mass or more and less than 100% by mass, or a homopolymer of methyl methacrylate is more preferable.

Examples of the other monomers include (meth)acrylate compounds other than methyl methacrylate such as methyl acrylate, ethyl(meth)acrylate, n-propyl(meth)acrylate, isopropyl(meth)acrylate, n-butyl(meth)acrylate, isobutyl(meth)acrylate, sec-butyl(meth)acrylate, tert-butyl(meth)acrylate, n-hexyl(meth)acrylate, cyclohexyl(meth)acrylate, n-octyl(meth)acrylate, 2-ethylhexyl(meth)acrylate, isobornyl(meth)acrylate, glycidyl(meth)acrylate, tetrahydrofurfuryl(meth)acrylate, norbornyl(meth)acrylate, adamantyl(meth)acrylate, dicyclopentenyl(meth)acrylate, dicyclopentanyl(meth)acrylate, 2-hydroxyethyl(meth)acrylate, 2-hydroxypropyl (meth)acrylate; (meth)acrylic acid; (meth)acrylonitrile; (meth)acrylamide compounds such as (meth)acrylamide, N,N-dimethyl(meth)acrylamide, N,N-diethyl(meth)acrylamide, and methylenebis(meth)acrylamide; aromatic vinyl compounds such as styrene and α-methylstyrene; vinyl ether compounds such as vinyl methyl ether, vinyl ethyl ether, and 2-hydroxyethyl vinyl ether; vinyl carboxylic acid compounds such as vinyl acetate and vinyl butyrate; olefin compounds such as ethylene, propylene, butene, and isobutene. These other monomers may be used alone, or two or more thereof may be used in combination.

From the viewpoint that the original performance of the acrylic resin is not impaired, among these other monomers, (meth)acrylate compounds other than methyl methacrylate are preferable, and from the viewpoint of excellent thermal decomposition resistance of the molded product, methyl acrylate, ethyl acrylate, n-butyl acrylate is more preferable, and methyl acrylate and ethyl acrylate are still more preferable.

In a case where the polymer (A1) contains other monomer units, from the viewpoint that the original performance of the (meth)acrylic resin is not impaired, a content ratio of the other monomer units in 100% by mass of the polymer (A1) is preferably more than 0% by mass and 20% by mass or less, more preferably more than 0% by mass and 10% by mass or less, and still more preferably more than 0% by mass and 5% by mass or less.

Examples of the method of producing the (meth)acrylic-based polymer (A) include a bulk polymerization method, a suspension polymerization method, an emulsion polymerization method, and a solution polymerization method. From the viewpoint of excellent productivity, among these polymerization methods, the (meth)acrylic-based polymer (A) is preferably produced by a bulk polymerization method or a suspension polymerization method, and is more preferably produced by bulk polymerization method.

A mass-average molecular weight of the (meth)acrylic-based polymer (A) is preferably 20,000 to 200,000, and more preferably 50,000 to 150,000.

In a case where the mass-average molecular weight of the (meth)acrylic-based polymer (A) is the above lower limit value or more, the mechanical properties of the obtained resin molded product tend to be excellent. In a case where the mass-average molecular weight of the (meth)acrylic-based polymer (A) is the upper limit value or less, the fluidity during melt molding tends to be excellent. The lower limit of the mass-average molecular weight of the (meth)acrylic-based polymer (A) is more preferably 50,000. In addition, the upper limit value of the mass-average molecular weight of the (meth)acrylic-based polymer (A) is more preferably 150,000.

In the present specification, the mass-average molecular weight is a value measured by using standard polystyrene as a standard sample with gel permeation chromatography.

The lower limit of the content ratio of the (meth)acrylic-based polymer (A) in the methacrylic-based resin composition is not particularly limited, and is preferably 55% by mass or more with respect to the total mass (100% by mass) of the methacrylic-based resin composition. The lower limit of the content ratio of the (meth)acrylic-based polymer (A) in the methacrylic-based resin composition is more preferably 70% by mass or more, and still more preferably 90% by mass or more. The upper limit of the content ratio of the (meth)acrylic-based polymer (A) is not particularly limited, and is preferably 99% by mass or less with respect to the total mass (100% by mass) of the methacrylic-based resin composition. The upper limit of the content ratio of the (meth)acrylic-based polymer (A) is more preferably 98% by mass or less, and still more preferably 97% by mass or less.

The upper limit and lower limit of the content ratio of the (meth)acrylic-based polymer (A) in the methacrylic-based resin composition can be optionally combined. For example, the content ratio of the (meth)acrylic-based polymer (A) is preferably 55% by mass or more and 99% by mass or less, more preferably 70% by mass or more and 98% by mass or less, and still more preferably 90% by mass or more and 97% by mass or less with respect to the total mass (100% by mass) of the methacrylic-based resin composition.

In a case where the content ratio of the (meth)acrylic-based polymer (A) in the methacrylic-based resin composition is the above lower limit value or more, it is less prone to impair the original performance of the acrylic resin in the obtained resin molded product, such as transparency, heat resistance, and weather resistance. In a case where the content ratio of the (meth)acrylic-based polymer (A) in the methacrylic-based resin composition is the above upper limit value or less, the obtained resin molded product tends to have excellent scratch resistance.

<Fatty Acid Compound (B)>

The fatty acid compound (B) is one of components of the methacrylic-based resin composition for forming the resin molded product of the present invention.

Since the methacrylic-based resin composition contains the fatty acid compound (B) and the value of P1/P2 is 0.0040 or more on the surface of the obtained resin molded product, the resin molded product of the present invention is excellent in scratch resistance.

In the present invention, the fatty acid compound (B) is preferably a chain hydrocarbon compound having at least one carbonyl group or carboxyl group in the molecule from the viewpoint that it is easy to make the obtained resin molded product excellent in the scratch resistance.

The chain hydrocarbon compound having at least one carbonyl group or carboxyl group in the molecule means a compound in which a carbon atom to which the carbonyl group or the carboxyl group is bonded is a constituent atom of a carbon chain. The carbon chain in the chain hydrocarbon compound having at least one carbonyl group or carboxyl group in the molecule may be saturated or unsaturated, and may be linear or branched.

Examples of the fatty acid compound (B) include fatty acids and derivatives thereof as chain hydrocarbon compounds having a carboxyl group in the molecule. Examples of the chain hydrocarbon compound having an amide group in the molecule include fatty acid amides and derivatives thereof. Examples of the chain hydrocarbon compound having an ester group or a carbonyl group in the molecule include fatty acid alkyl esters and derivatives thereof, and fatty acid glycerides and derivatives thereof.

The derivatives of the fatty acid, the derivatives of the fatty acid amide, the derivatives of the fatty acid alkyl ester, and the derivatives of the fatty acid glyceride are compounds having a structure in which a hydrogen atom in the chain hydrocarbon compound or a part or all of the side chain has been replaced with another organic group. Examples of the organic group include a polyether group, a polyalkyl group, an aralkyl group, and a polyester group, which may be used alone or two or more thereof may be used in combination.

Furthermore, the derivatives of the fatty acid amide can be appropriately selected and used from various compounds such as monoamide and bisamide depending on various situations.

These fatty acid compound (B) may be used alone or two or more thereof may be used in combination.

The upper limit of a solubility parameter value of the fatty acid compound (B) is not particularly limited, but is preferably 11.0 $(cal/cm^3)^{1/2}$ or less from the viewpoint that compatibility with an acrylic resin tends to be excellent and scratch resistance of the obtained resin molded product is favorably maintained. The upper limit of a solubility parameter value of the fatty acid compound (B) is more preferably 10.5 $(cal/cm^3)^{1/2}$ or less, and still more preferably 10.0 $(cal/cm^3)^{1/2}$ or less. The lower limit of a solubility parameter value of the fatty acid compound (B) is not particularly limited, but is preferably 9.0 $(cal/cm^3)^{1/2}$ or more from the viewpoint that scratch resistance of the obtained resin molded product is excellent since compatibility with an acrylic resin tends to be excellent. The lower limit of a solubility parameter value of the fatty acid compound (B) is, preferably 9.2 $(cal/cm^3)^{1/2}$ or more, and still more preferably 9.4 $(cal/cm^3)^{1/2}$ or more.

The above upper limit and lower limit can be optionally combined. For example, the solubility parameter value of the fatty acid compound (B) is preferably 9.0 $(cal/cm^3)^{1/2}$ or more and 11.0 $(cal/cm^3)^{1/2}$ or less, more preferably 9.2 $(cal/cm^3)^{1/2}$ or more and 10.5 $(cal/cm^3)^{1/2}$ or less, still more preferably 9.4 $(cal/cm^3)^{1/2}$ or more and 10.0 $(cal/cm^3)^{1/2}$ or less.

The solubility parameter value (SP value) is a scale of solubility. The larger the SP value, the higher the polarity, and conversely, the smaller the SP value, the lower the polarity. In the present invention, the SP value is calculated by the method proposed by Fedors and others. Specifically, the SP value can be calculated by referring to "POLYMER ENGINEERING AND SCIENCE, FEBRUARY, 1974, Vol. 14, No. 2, ROBERT F. FEDORS. (Pages 147 to 154)".

The upper limit of the 10% weight-reduction temperature of the fatty acid compound (B) is not particularly limited, but is preferably 308° C. or lower from the viewpoint that the scratch resistance of the obtained resin molded product is more favorable. Although the reason for this is not clear, it is presumed that as the 10% weight-reduction temperature is lowered, the fatty acid compound (B) included in the methacrylic-based resin composition volatilizes in the metal mold during injection molding and adheres to a surface of the metal mold to be liquefied and condensed, and the fatty acid compound (B) adhering to the surface of the metal mold is then diffused and migrated to the methacrylic-based resin composition injected into the metal mold later, and as a result, the fatty acid compound (B) tends to be present in a high content ratio on the surface of the obtained resin molded product and the vicinity of the surface. The 10% weight-reduction temperature of the fatty acid compound (B) is more preferably 280° C. or lower, and still more preferably 260° C. or lower. On the other hand, the lower limit of the 10% weight-reduction temperature of the fatty acid compound (B) is not particularly limited, but is preferably 190° C. or higher from the viewpoint that the scratch resistance of the obtained resin molded product is more favorable. Although the reason for this is not clear, it is presumed that the effect of the fatty acid compound (B) can be sufficiently exhibited without thermal decomposition of the fatty acid compound (B) during injection molding in a case where the 10% weight-reduction temperature is 190° C. or higher. The 10% weight-reduction temperature of the fatty acid compound (B) is more preferably 200° C. or higher, and still more preferably 210° C. or higher.

The upper limit and lower limit of the 10% weight-reduction temperature of the fatty acid compound (B) can be optionally combined. For example, the 10% weight-reduction temperature of the fatty acid compound (B) is preferably 190° C. or higher and 308° C. or lower, more preferably 200° C. or higher and 280° C. or lower, and still more preferably 210° C. or higher and 260° C. or lower.

The lower limit of a melting point of the fatty acid compound (B) is not particularly limited, but is preferably 90° C. or higher from the viewpoint that the scratch resistance of the obtained resin molded product is more favorable. Although the reason for this is not clear, it is presumed that in a case where the melting point is 90° C. or higher, the time when the fatty acid compound (B) included in the methacrylic-based resin composition volatilizes in the metal mold during injection molding and adheres to a surface of the metal mold to be liquefied and condensed is short, and the reduction of the amount of the fatty acid compound (B) discharged from a gas vent as gas and adhering to the surface of the metal mold is suppressed, and as a result, the fatty acid compound (B) tends to be present in a high content ratio on the surface of the obtained resin molded product and the vicinity of the surface. The melting point of the fatty acid compound (B) is more preferably 95° C. or higher, and still more preferably 100° C. or higher. On the other hand, the upper limit of the melting point of the fatty acid compound (B) is not particularly limited, but is preferably 150° C. or lower from the viewpoint that the scratch resistance of the obtained resin molded product is more favorable. Although the reason for this is not clear, it is presumed that in a case where the melting point of the fatty acid compound (B) is 150° C. or lower, the fatty acid compound (B) included in the methacrylic-based resin composition sufficiently vola-tilizes in the metal mold during injection molding, and the above-mentioned actions and effects can be easily obtained. The melting point of the fatty acid compound (B) is more preferably 130° C. or lower, and still more preferably 120° C. or lower.

The upper limit and lower limit of the melting point of the fatty acid compound (B) can be optionally combined. For example, the melting point of the fatty acid compound (B) is preferably 90° C. or higher and 150° C. or lower, more preferably 95° C. or higher and 130° C. or lower, and still more preferably 100° C. or higher and 120° C. or lower.

Among these fatty acid compounds (B), a fatty acid amide compound and a derivative thereof (hereinafter, these are collectively referred to as a "fatty acid amide compound (B1)") are preferable.

As the fatty acid amide compound (B1), a compound represented by the following General Formula (i) (herein-after, also referred to as a "compound (i)") can be used. The compound (i) is preferable from the viewpoint that the obtained resin molded product is excellent in the scratch resistance even with a small blending amount, and the original performance of the (meth)acrylic resin is not prone to be impaired, $$R—CONH_2 \qquad \text{(i)}$$

(in the General Formula (i), R is a hydrocarbon group having 10 to 25 carbon atoms which may have a substitu-ent).

The lower limit of the number of carbon atoms of R in Formula (i) of the fatty acid amide compound (B1) is preferably 10 or more, more preferably 15 or more, and still more preferably 17 or more from the viewpoint of excellent in compatibility with the (meth)acrylic-based polymer (A) and excellent in the scratch resistance of the obtained resin molded product. The upper limit of the number of carbon atoms of R in Formula (i) of the fatty acid amide compound (B1) is preferably 25 or less, and more preferably 24 or less, and still more preferably 23 or less from the viewpoint that the dispersibility of the fatty acid compound (B) in the methacrylic-based resin composition is favorable, and scratch resistance of the obtained resin molded product can be favorably maintained.

The above preferable upper limit and preferable lower limit can be optionally combined. For example, the number of carbon atoms of R in Formula (i) of the fatty acid amide compound is preferably 10 to 25, more preferably 15 to 24, and still more preferably 17 to 23.

The fatty acid amide compound (B1) is preferable from the viewpoint of tending to be excellent in the compatibility with the (meth)acrylic-based polymer (A), the fluidity of the methacrylic-based resin composition, and the scratch resis-tance of the obtained resin molded product.

Examples of the fatty acid amide compound (B1) include saturated fatty acid amide compounds, unsaturated fatty acid amide compounds, bis fatty acid amide compounds, and methylol fatty acid amide compounds. These fatty acid amide compounds may be used alone or two or more thereof may be used in combination. Among these fatty acid amide compounds (B1), saturated fatty acid amide compounds are preferable from the viewpoint of being excellent in the scratch resistance of the obtained resin molded product.

Examples of the saturated fatty acid amide compounds include lauric acid amide, palmitic acid amide, stearic acid amide, behenic acid amide, hydroxystearic acid amide, and methylol stearic acid amide.

These saturated fatty acid amide compounds may be used alone or two or more thereof may be used in combination.

From the viewpoint that the obtained resin molded prod-uct is excellent in the scratch resistance, the saturated fatty acid amide compound preferably contains either stearic acid amide or palmitic acid amide, and the saturated fatty acid amide compound preferably contains stearic acid amide and palmitic acid amide as main components. Here, "containing as a main component" means that the total mass of the stearic acid amide and the palmitic acid amide with respect to the total mass (100% by mass) of the fatty acid amide compound is 85.0% by mass or more.

Examples of unsaturated fatty acid amides include erucic acid amides, oleic acid amides, brassie acid amides, and ellagic acid amides.

These unsaturated fatty acid amide compounds may be used alone or two or more thereof may be used in combi-nation.

Among these unsaturated fatty acid amide compounds, erucic acid amide and oleic acid amide are preferable, and erucic acid amide is more preferable from the viewpoint that the obtained resin molded product is excellent in the scratch resistance.

Examples of the bis fatty acid amide compound include bis fatty acid amides such as methylene bisstearic acid amide, methylene bisoleic acid amide, ethylene bisstearic acid amide, and ethylene bisoleic acid amide; stearyl stearic acid amide, stearyl erucic acid amide, and oleyl palmitic acid amide.

These bis fatty acid amide compounds may be used alone or two or more thereof may be used in combination.

The lower limit of the content ratio of the fatty acid compound (B) included in the methacrylic-based resin com-position is preferably 0.01% by mass or more, more pref-erably 0.1% by mass or more, and still more preferably 1.0% by mass or more with respect to 100% by mass of the total mass of the methacrylic-based resin composition, from the viewpoint that the obtained resin molded product is excel-lent in the scratch resistance. On the other hand, the upper limit of the content of the fatty acid compound (B) included in the methacrylic-based resin composition is preferably 10% by mass or less, more preferably 5.0% by mass or less, and still more preferably 3.0% by mass or less with respect to 100% by mass of the total mass of the methacrylic-based resin composition, from the viewpoint that the original performance of the acrylic resin in the obtained resin molded product is not prone to be impaired.

The above preferable upper limit and preferable lower limit can be optionally combined. For example, the content of the fatty acid compound (B) included in the methacrylic-based resin composition is preferably 0.01% by mass or more and 10% by mass or less, more preferably 0.1% by mass or more and 5.0% by mass or less, and still more preferably 1.0% by mass or more and 3.0% by mass or less with respect to 100% by mass of the total mass of the methacrylic-based resin composition.

<Method of Producing Resin Molded Product>

A method of producing a resin molded product of the present invention is a method of producing a resin molded product obtained by performing injection molding on the methacrylic-based resin composition containing the above-mentioned (meth)acrylic-based polymer (A) and the above-mentioned fatty acid compound (B). A resin molded product produced by the method of producing a resin molded product of the present invention preferably has the above-mentioned absorbance ratio P1/P2 of 0.0040 or more. Such a resin molded product can be obtained by, for example, a production method described below.

As the injection molding used in the method of producing a resin molded product of the present invention, a known injection molding method can be used.

In particular, in the method of producing a resin molded product of the present invention, in a case where the methacrylic-based resin composition containing the (meth) acrylic-based polymer (A) and the fatty acid compound (B) is subjected to injection molding, the methacrylic-based resin composition is melt-kneaded under a condition in which a cylinder temperature of an injection molding machine is 248° C. or higher and 300° C. or lower and injected into a metal mold.

In a case where the lower limit of the cylinder temperature of the injection molding machine is 248° C. or higher during the injection molding, the scratch resistance of the obtained resin molded product tends to be favorable. Although the reason for this is not clear, it is presumed that in a case where the cylinder temperature is 248° C. or higher, the fatty acid compound (B) included in the methacrylic-based resin composition is likely to volatilize in the metal mold during injection molding and adheres to a surface of the metal mold to be liquefied and condensed, and the fatty acid compound (B) adhering to the surface of the metal mold is then diffused and migrated to the methacrylic-based resin composition injected into the metal mold later, and as a result, the fatty acid compound (B) tends to be present in a high content ratio on the surface of the obtained resin molded product and the vicinity of the surface. The cylinder temperature of the injection molding machine is more preferably 265° C. or higher during the injection molding. In a case where the upper limit of the cylinder temperature of the injection molding machine is 300° C. or lower during the injection molding, it is easy to maintain favorable scratch resistance and transparency of the obtained resin molded product. Although the reason for this is not clear, it is presumed that in a case where the cylinder temperature of the injection molding machine is 300° C. or lower, the thermal decomposition of the fatty acid compound (B) during the injection molding is suppressed, and the effect of the fatty acid compound (B) is sufficiently obtained. The cylinder temperature of the injection molding machine is more preferably 295° C. or lower, and still more preferably 290° C. or lower during the injection molding.

The above preferable upper limit and preferable lower limit can be optionally combined. For example, the cylinder temperature of the injection molding machine is 248° C. or higher and 300° C. or lower, preferably 248° C. or higher and 295° C. or lower, and more preferably 265° C. or higher and 290° C. or lower during the injection molding of the methacrylic-based resin composition containing the (meth) acrylic-based polymer (A) and the fatty acid compound (B).

In the method of producing a resin molded product of the present invention, the cylinder temperature of the injection molding machine means the highest temperature in a compression zone and a metering zone of the cylinder of the injection molding machine. Specifically, a plurality of heaters are mounted on each part of the barrel of the injection molding machine to heat the cylinder of an injection molding machine usually. For example, in a case of 8 divisions (8 columns), 8 heaters are mounted on each part of the barrel toward an outlet portion (resin discharge portion, metal mold connection portion) of the injection molding machine from a hopper inlet portion (resin supply portion). Then, a temperature of each column is measured using a thermocouple type thermometer installed at the tip of a probe inside each heater. The highest temperature among temperature measurement values obtained in the columns of the compression zone and the metering zone of the cylinder of the injection molding machine is defined as the cylinder temperature of the injection molding machine.

In a case where the content ratio of the fatty acid compound (B) is increased to such an extent that the absorbance ratio P1/P2 is 0.0040 or more when the cylinder temperature of the injection molding machine is lower than 248° C. during injection molding, the influence that the fatty acid compound (B) itself acts as a plasticizer for the (meth) acrylic-based polymer (A) is remarkable during the injection molding. As a result, the molding stability is remarkably lowered, for example, a fusion phenomenon due to the plasticization of the (meth)acrylic-based polymer (A), and it tends to be difficult to easily obtain the resin molded product by melt kneading or injection molding.

During the injection molding, it is preferable that a metal mold temperature of the metal mold is set to 35° C. or higher and 90° C. or lower in advance.

In a case where the metal mold temperature during the injection molding is 35° C. or higher, the appearance of the obtained resin molded product easily becomes favorable. Although the reason for this is not clear, it is presumed that in a case where the metal mold temperature is 35° C. or higher, the methacrylic-based resin composition is rapidly cooled, and it tends to easily suppress the occurrence of defects such as sink marks in the resin molded product obtained by injection molding. The metal mold temperature during the injection molding is more preferably 36° C. or higher, and still more preferably 37° C. or higher. On the other hand, in a case where the metal mold temperature is 90° C. or lower during the injection molding, it is easy to maintain favorable scratch resistance and transparency of the obtained resin molded product. Although the reason for this is not clear, it is presumed that in a case where the metal mold temperature is 90° C. or lower, the time when the fatty acid compound (B) included in the methacrylic-based resin composition adheres to a surface of the metal mold to be liquefied and condensed is short, and the reduction of the amount of the fatty acid compound (B) adhering to the mold surface discharged from a gas vent as gas is suppressed, and as a result, the above-mentioned acts and effects are easily obtained. The metal mold temperature is more preferably 70° C. or lower, and still more preferably 50° C. or lower.

The above preferable upper limit and preferable lower limit can be optionally combined. For example, the metal mold temperature is preferably set to 35° C. or higher and 90° C. or lower in advance, more preferably set to 36° C. or higher and 70° C. or lower in advance, and still more preferably set to 37° C. or higher and 50° C. or lower in advance during the injection molding of the methacrylic-based resin composition containing the (meth)acrylic-based polymer (A) and the fatty acid compound (B).

In the present invention, the metal mold temperature during the injection molding refers to a surface temperature of a cavity portion of the metal mold for forming a predetermined shape, which is filled with the methacrylic-based resin composition, and can be measured by using a contact type surface thermometer.

In the method of producing a resin molded product of the present invention, the scratch resistance of the obtained resin molded product is favorable by an injection speed of 30 $cm^3$/sec or less during the injection molding. Although the reason for this is not clear, it is presumed that in a case where the injection speed during injection molding is 30 $cm^3$/sec or less, the fatty acid compound (B) included in the methacrylic-based resin composition sufficiently volatilizes in the metal mold during the injection molding, and as a result, the fatty acid compound (B) can be present in a high content ratio on the surface of the obtained resin molded product and the vicinity of the surface. The injection speed is more preferably 12 $cm^3$/sec or less, and still more preferably 8 $cm^3$/sec or less during the injection molding. The injection speed can also be 5 $cm^3$/sec or less during injection molding.

In the present invention, the injection speed is defined by injection resin volume/resin filling time (unit: $cm^3$/sec). A resin filling time refers to an injection time when variation in a distance according to an increase in the injection time when a distance from a screw to a nozzle is plotted with the injection time on the horizontal axis and the distance from a screw head to a nozzle head on the vertical axis while increasing the injection time is no longer recognized.

In the method of producing a resin molded product of the present invention, it is possible to obtain the resin molded product excellent in scratch resistance, which is produced in such a manner that in the surface of the obtained resin molded product within the range of the above-mentioned producing conditions, a peak absorbance ratio P1/P2 of a peak absorbance P1 in a wave number range of 1630 to 1650 $cm^{-1}$ to a peak absorbance P2 in a wave number range of 1710 to 1730 $cm^{-1}$ on a surface of the resin molded product, measured by a single reflection ATR surface reflection method with an infrared spectrophotometer, is 0.0040 or more.

EXAMPLES

Hereinafter, the present invention will be specifically described with reference to Examples, but the present invention is not limited to these Examples.

Various measurements and evaluations in Examples and Comparative Examples were carried out by the following methods.

<Production of Molded Product>

Pellets of a methacrylic-based resin composition obtained in Examples and Comparative Examples were dried with hot air at 80° C. for about 4 hours, and thereafter by using an injection molding machine (model name: EC75SX-III, manufactured by Toshiba Machine Co., Ltd.), injection molding was carried out under predetermined conditions of a cylinder temperature, a metal mold temperature, and an injection speed described later to obtain a molded product (A) (length 100 mm, width 100 mm, thickness 3 mm).

<Scratch Resistance>

As an index of the scratch resistance of the resin molded product, a haze value before and after the scratch resistance test and a difference ($\Delta$ haze) thereof were measured according to the following method.

The molded product (A) was installed on a flat table, and by using a friction tester (friction tester S type for color fastness, friction tester type II described in JIS L 0849 was remodeled into a flat type, Toyo Seiki Seisaku-sho, Ltd.) and using a flat friction element (length 20 mm, width 20 mm) with 5 layers of gauze (trade name, YAMATOKOJO CO., LTD. medical gauze, earth dragonfly, 100% cotton) as a friction element, a friction element was reciprocated 50 times at a distance of 100 mm under the condition of a load of 1000 g to form a friction wear treatment portion 2 on a surface of the molded product (A) such that as shown in FIG. 1, a center portion 3 of the molded product (A) passes through the surface of the molded product (A) at an angle of 45° viewed from a MD direction (flow direction during molding) and a TD direction (direction orthogonal to the flow direction during the molding), respectively, at a position of a gate 4 during the injection molding.

Next, by using a haze meter (model name: NDH4000, manufactured by Nippon Denshoku Kogyo Co., Ltd.), a light beam was incident on the center portion 3 (the test piece subjected to the scratch resistance test is the center portion of the surface on which the friction wear treatment portion 2 is formed) of the molded product (A) in a direction parallel to the direction in which the friction element was reciprocated to measure a haze value of the molded product (A) in accordance with ISO 14782 with respect to the test piece (molded product (A)) before and after the scratch resistance test. By using three test pieces of the molded product (A), measurement was performed once for each test piece, and an average value was taken as the haze value. The haze values before and after the scratch resistance test described above and a difference between the haze values ($\Delta$ haze) were calculated.

<Absorbance Ratio P1/P2>

Regarding the surface of the resin molded product, infrared absorption (IR) spectra with wavenumbers 2000-1500 $cm^{-1}$ were measured on the surface of the molded product (A) by a single reflection ATR surface reflection method using a Fourier transform infrared spectrophotometer (ATR: Thermo Fisher Scientific Corporation, model: Nicolet iS10).

The measurement conditions according to the single reflection ATR surface reflection method are as follows.

Figure 2:
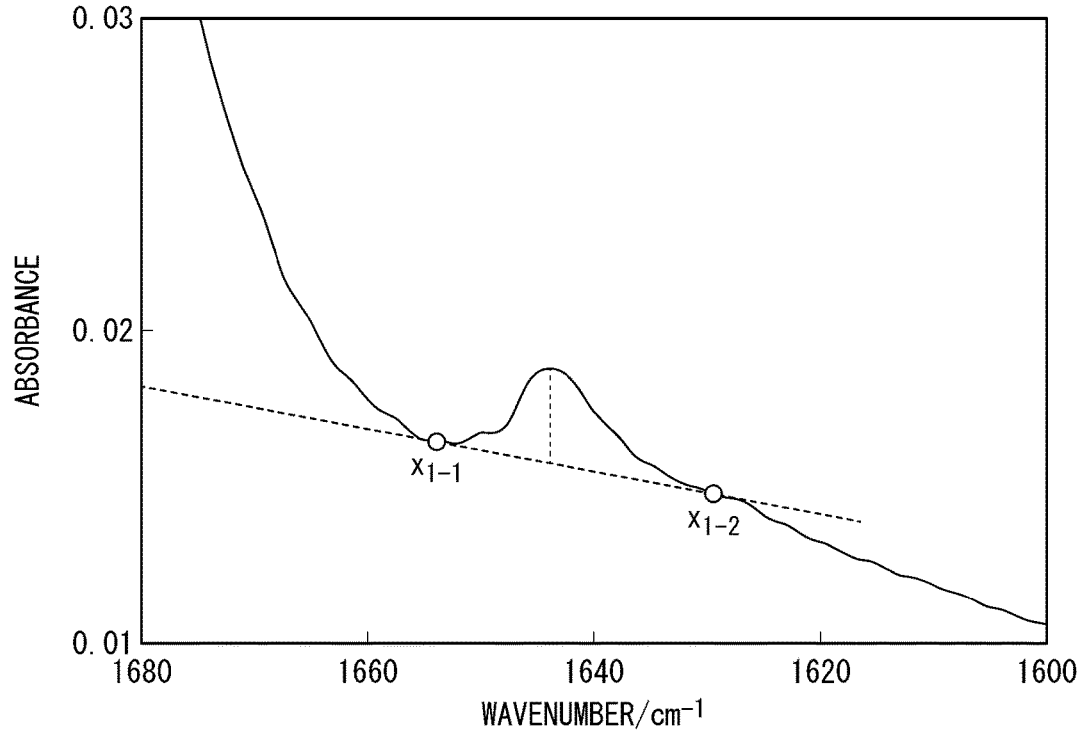
FIG. 2 is an infrared absorption spectrum having wave numbers 1600 to 1680 cm⁻¹ measured on a surface of the resin molded product (molded product (A)) with a Fourier transform infrared spectrophotometer.
Figure 3:
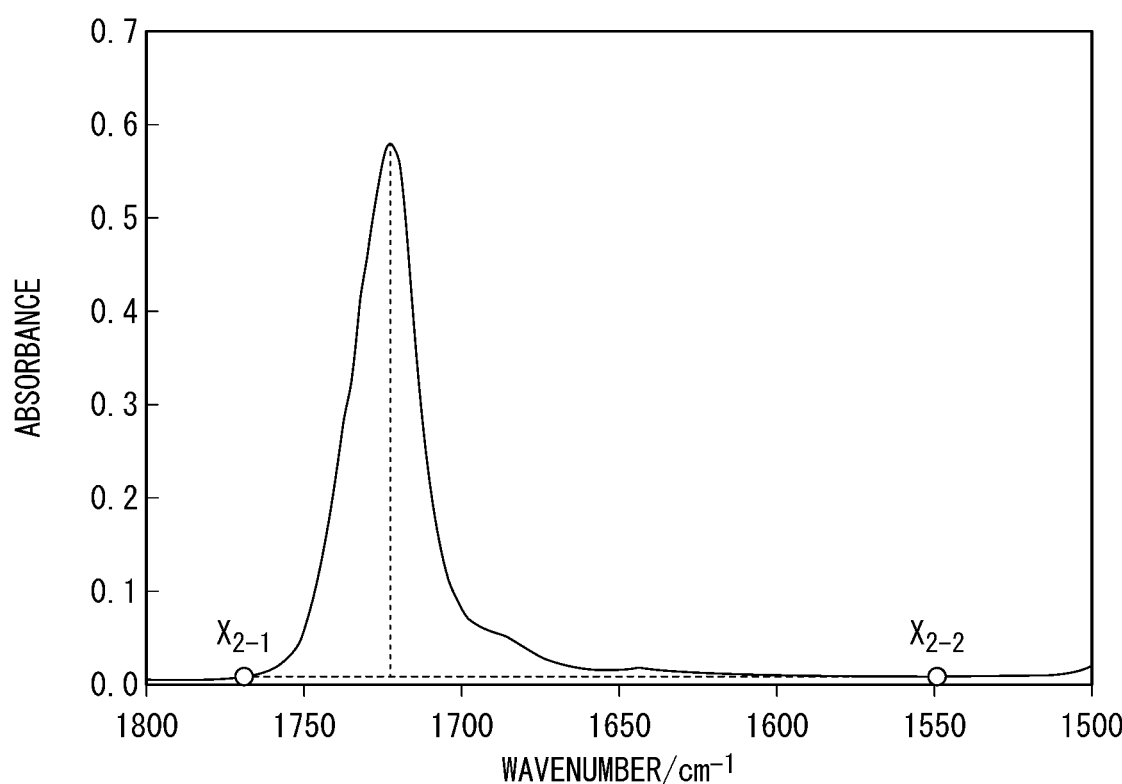
FIG. 3 is an infrared absorption spectrum having wave numbers 1620 to 1800 cm⁻¹ measured on the surface of the resin molded product (molded product (A)) with a Fourier transform infrared spectrophotometer.

Light source: Infrared light (IR)
Detector: DTGS-KBr
Beam splitter: KBr
Resolution: 4 $cm^{-1}$
Attached device: Single reflection type horizontal ATR (Smart-iTR, manufactured by Thermo Fisher Scientific Corporation)
Prism: Diamond
Incident angle: 45°
Polarization: None Regarding the obtained IR spectrum, as shown in FIG. 2, a baseline was drawn between a position ($x_{1-1}$) where a peak in the wave number range of 1650 to 1660 $cm^{-1}$ indicates the minimum absorbance and a position ($x_{1-2}$) with a wave number of 1630 $cm^{-1}$ to calculate the absorbance P1 with the wavenumber indicating the maximum absorbance of the peak in the range of wavenumber 1630 to 1650 $cm^{-1}$. Furthermore, as shown in FIG. 3, a baseline was drawn between a position with the wave number 1770 $cm^{-1}$ ($x_{2-1}$) and a position with the wave number 1550 $cm^{-1}$ ($x_{2-2}$) to calculate the absorbance P2 with the wave number of which a peak indicates the maximum absorbance within a wave number range of 1710 to 1730 cm$^{-1}$.

The absorbance ratio P1/P2 was calculated by dividing P1 by P2.

<10% Weight-Reduction Temperature>

The 10% weight-reduction temperature of the fatty acid compound (B) was measured using a thermogravimetric analyzer (TGA) (manufactured by Seiko Instruments, Inc., model: TG/DTA6200) according to the following method.

While dry nitrogen flows at 100 ml/min, the temperature was raised from 40° C. to 500° C. at a heating rate of 10° C./min, and a temperature at which the weight loss rate was 10% (weight was reduced by 10% by mass) was measured.

<Melting Point>

The melting point of the fatty acid compound (B) was evaluated by the following method using a differential scanning calorimeter (DSC) (manufactured by Seiko Instruments Inc., model: DSC-6200).

Approximately 10 mg of the fatty acid compound (B) was charged in an aluminum sample container, heated to 200° C. at a heating rate of 10° C./min, held for 5 minutes to melt, and cooled to 0° C. at 10° C./min, and thereafter, heated again at a heating rate of 10° C./min, held for 5 minutes, and cooled at 10° C./min. The maximum point of a crystal melting peak observed at this time was taken as a melting point of the fatty acid compound (B)

<Content Ratio of Fatty Acid Compound (B)>

A content ratio of the fatty acid compound in the resin molded product was measured with a gas chromatography measuring device (GC device) (manufactured by Agilent Technologies, Inc., product name: Gas chromatography GC7890B, column used: HP-5 manufactured by Agilent J&W, outer diameter 0.32 mm/film thickness 0.25 μm, length 30 m, detector: FID) by the following method.

0.2 g of a piece cut out from the molded product (A) was dissolved in 5 ml of acetone and added dropwise to 30 ml of methanol to obtain a precipitate. Then, the precipitate was removed using a filter paper, and a supernatant solution obtained was used as a sample for GC.

1.0 μl of a GC sample was injected into a GC device (injection port temperature: 280° C., detector temperature: 280° C., split ratio: 1/50, carrier gas: He), held at 80° C. for 2 minutes, and then heated to 300° C. at a heating rate of 10° C./min. Based on a peak area of the fatty acid compound in the obtained gas chromatogram and the calibration curve prepared in advance using a standard solution of the fatty acid compound having a known concentration, a content ratio (% by mass) of the fatty acid compound included in the molded product (A) (100% by mass) was calculated.

<Dynamic Friction Coefficient/Static Friction Coefficient>

As an index of the friction and wear resistance of the resin molded product, a dynamic friction coefficient/static friction coefficient was measured according to the following method.

By using a scratch tester KK01 (manufactured by Kato Tech Co., Ltd.), a spherical indenter with a diameter of 1 mm was pressed against a surface of the molded product (A) in accordance with ISO 19252, and while keeping the horizontal load of the indenter constant (5.0 N), a vertical load (unit: N) obtained in a case where the indenter was moved on the surface of the molded product (A) at a moving speed of the indenter of 100 mm/sec and a moving distance of the indenter of 70 mm was measured.

The dynamic friction coefficient was defined as a value obtained by dividing the horizontal load (5.0 N) by an average value of the vertical load measured in a section of 10 to 60 mm based on the starting point of the moving distance (70 mm).

Furthermore, with respect to the value obtained by dividing the horizontal load (5.0 N) by the vertical load, the maximum value of a value measured immediately after the start of movement of the indenter was taken as the static friction coefficient.

By using three test pieces of the molded products (A), measurement was performed once for each test piece, the dynamic friction coefficient and the static friction coefficient were calculated, and average values were taken as the final dynamic friction coefficient and static friction coefficient.

<Water Contact Angle>

In an environment of 23° C. and 50% relative humidity, one drop of 0.2 μL of water was added dropwise on the surface of the molded product (A), and a contact angle of the surface of the molded product (A) with respect to water was determined using a portable contact angle meter (manufactured by MATSUBO Corporation, trade name: PG-X).

(Raw Materials)

Acrylic resin (A-1): Acrypet (registered trademark) VH (trade name, manufactured by Mitsubishi Chemical Corporation, acrylic-based resin containing 98% by mass of methyl methacrylate unit)

Fatty acid compound (B-1): Mixture of fatty acid amides containing stearic acid amide and palmitic acid amide as main components (trade name: Fatty acid amide S, manufactured by Kao Corporation)

Fatty acid compound (B-2): Mixture of fatty acid amides containing stearic acid amide and palmitic acid amide as main components (trade name: IncroMax (registered trademark) PS, manufactured by Croda International P1c)

Fatty acid compound (B-3): Mixture of fatty acid amides containing stearic acid amide and palmitic acid amide as main components (trade name: Amide AP-1, manufactured by Mitsubishi Chemical Corporation)

Fatty acid compound (B-4): Mixture of fatty acid amides containing palmitic acid amide as a main component (trade name: Diamid (registered trademark) KP, manufactured by Mitsubishi Chemical Corporation)

Fatty acid compound (B-5): Mixture of fatty acid amides containing methylol stearic acid amide as a main component (trade name: Methylol amide, manufactured by Mitsubishi Chemical Corporation)

Fatty acid compound (B-6): Mixture of fatty acid amides containing methylene bisstearic acid amide as a main component (bisamide LA, manufactured by Mitsubishi Chemical Corporation)

Fatty acid compound (B-7): Mixture of fatty acid amides containing hydroxystearic acid amide as a main component (Diamid (registered trademark) KH, manufactured by Mitsubishi Chemical Corporation)

Fatty acid compound (B-8): Mixture of fatty acid amides containing erucic acid amide as a main component (trade name: Diamid (registered trademark) L-200, manufactured by Mitsubishi Chemical Corporation)

Fatty acid compound (B-9): Mixture of fatty acid amides containing stearyl stealic acid amide as a main component (Nikka Amide (registered trademark) S, manufactured by Mitsubishi Chemical Corporation)

Fatty acid compound (B-10): Mixture of fatty acid amides containing staryloleic acid amide as a main component (trade name: Nikka Amide (registered trademark) SO, manufactured by Mitsubishi Chemical Corporation)

Fatty acid compound (B-11): Mixture of fatty acid amides containing oleyl stearic acid amide as a main component (trade name: Nikka Amide (registered trademark) OS, manufactured by Mitsubishi Chemical Corporation)

Fatty acid compound (B-12): Mixture of fatty acid amides containing ethylene bisstearic acid amide as a main component (trade name: Slipax (registered trademark) E, manufactured by Mitsubishi Chemical Corporation)

Fatty acid compound (B-13): Mixture of fatty acid amides containing ethylenebisoleic acid amide as a main component (trade name: Slipax (registered trademark) O, manufactured by Mitsubishi Chemical Corporation)

Fatty acid compound (B-14): Mixture of fatty acid amides containing ethylene biserucic acid amide as a main component (trade name: Slipax (registered trademark) L, manufactured by Mitsubishi Chemical Corporation)

Fatty acid compound (B-15): Mixture of fatty acid amides containing hexamethylene bisoleic acid amide as a main component (trade name: Slipax (registered trademark) ZHO, manufactured by Mitsubishi Chemical Corporation)

Fatty acid compound (B-16): Mixture of fatty acid amides containing hexamethylene bisstearic acid amide as a main component (trade name: Slipax (registered trademark) ZHS, manufactured by Mitsubishi Chemical Corporation)

Fatty acid compound (B-17): Mixture of fatty acid amides containing hexamethylene bishydroxystearic acid amide as a main component (trade name: Slipax (registered trademark) ZHH, manufactured by Mitsubishi Chemical Corporation)

Fatty acid compound (B-18): Mixture of fatty acid amides containing lauric acid amide as a main component (trade name: Diamid (registered trademark) Y, manufactured by Mitsubishi Chemical Corporation)

Fatty acid compound (B-19): Mixture of fatty acid amides containing oleic acid amide as a main component (trade name: Diamid (registered trademark) O-200, manufactured by Mitsubishi Chemical Corporation)

Here, in fatty acid compounds (B-1) to (B-20), "containing as a main component" means to include 70% by mass or more of the target component with respect to the total mass (100% by mass) of the fatty acid compound (B).

Example 1

100 parts by mass of the acrylic resin (A-1) and 2 parts by mass of the fatty acid compound (B-1) as the fatty acid compound (B) were supplied to a twin-screw extruder (model name "PCM30", manufactured by Ikegai Corp.) and melt-kneaded at a cylinder temperature of 250° C. in the extruder to obtain a pellet-shaped methacrylic-based resin composition at a metal mold temperature of 60° C. and an injection speed of 23.3 cm³/sec.

The evaluation results of the obtained methacrylic-based resin composition are shown in Table 2.

Comparative Example 1

The operation was carried out in the same manner as in Example 1 except that the fatty acid compound (B) was not used, to obtain a pellet-shaped methacrylic-based resin composition. The evaluation results of the obtained methacrylic-based resin composition are shown in Table 2.

Examples 2 to 5, Comparative Examples 2 to 12

The operation was carried out in the same manner as in Example 1 except that the type of the fatty acid compound (B) was set as shown in Table 1, to obtain a pellet-shaped methacrylic-based resin composition. The evaluation results of the obtained methacrylic-based resin composition are shown in Table 2.

The content ratio of the fatty acid compound (B) in Table 2 indicates the content ratio (% by mass) of the fatty acid compound (B) to the total mass (100% by mass) of the methacrylic-based resin composition.

In Table 1, the reason why the content ratio (% by mass) of the fatty acid compound (B) in Table 2 is different in each example although the blending amount of the fatty acid compound (B) is 2.0 parts by mass is because a part of the fatty acid compound (B) was thermally decomposed or volatilized and removed out to the metal mold when the mixture was kneaded with a twin-screw extruder or the resin molded product was obtained by the injection molding machine. The same applies to Tables 3 and 4, and Tables 5 and 6 below.

TABLE 1

| | | (Meth)acrylic-based polymer (A) | | Fatty acid compound (B) | | | | |
|---|---|---|---|---|---|---|---|---|
| | | Type | Blending amount (parts by mass) | Type | 10% weight-reduction temperature (° C.) | Melting point (° C.) | SP value (cal/ cm³)^{1/2} | Blending amount (parts by mass) |
| Example | 1 | (A-1) | 100 | (B-1) | 243.2 | 103.0 | 9.86 | 2.0 |
| | 2 | (A-1) | 100 | (B-2) | 245.6 | 109.0 | 9.86 | 2.0 |
| | 3 | (A-1) | 100 | (B-3) | 241.5 | 101.0 | 9.86 | 2.0 |
| | 4 | (A-1) | 100 | (B-4) | 238.0 | 100.0 | 10.00 | 2.0 |
| | 5 | (A-1) | 100 | (B-5) | 219.5 | 111.0 | 10.54 | 2.0 |
| Comparative Example | 1 | (A-1) | 100 | — | — | — | — | — |
| | 2 | (A-1) | 100 | (B-7) | 268.6 | 107.0 | 11.04 | 2.0 |
| | 3 | (A-1) | 100 | (B-8) | 275.0 | 81.0 | 9.67 | 2.0 |
| | 4 | (A-1) | 100 | (B-9) | 339.4 | 95.0 | 9.00 | 2.0 |
| | 5 | (A-1) | 100 | (B-10) | 329.6 | 67.0 | 9.01 | 2.0 |
| | 6 | (A-1) | 100 | (B-11) | 335.5 | 72.0 | 9.01 | 2.0 |
| | 7 | (A-1) | 100 | (B-12) | 338.1 | 145.0 | 9.60 | 2.0 |
| | 8 | (A-1) | 100 | (B-13) | 343.7 | 119.0 | 9.63 | 2.0 |
| | 9 | (A-1) | 100 | (B-14) | 312.1 | 158.0 | 10.02 | 2.0 |
| | 10 | (A-1) | 100 | (B-15) | 385.0 | 110.0 | 9.53 | 2.0 |
| | 11 | (A-1) | 100 | (B-16) | 376.4 | 141.0 | 9.51 | 2.0 |
| | 12 | (A-1) | 100 | (B-17) | 383.4 | 135.0 | 10.59 | 2.0 |

TABLE 2

| | | Fatty acid compound (B) | | Dynamic friction coefficient | | | | Total reflection measurement method | | | Water contact angle | Scratch resistance | | |
|---|---|---|---|---|---|---|---|---|---|---|---|---|---|---|
| | | Type | Content ratio (% by mass) | n = 1 | n = 2 | n = 3 | Average | P1 | P2 | P1/P2 | Degree | Before test (Haze) | After test (Haze) | After test (ΔHaze) |
| Example | 1 | (B-1) | 1.50 | 0.05 | 0.05 | 0.04 | 0.05 | 0.0029 | 0.5784 | 0.00496 | 78.8 | 0.21 | 0.22 | 0.01 |
| | 2 | (B-2) | 1.53 | 0.08 | 0.07 | 0.07 | 0.07 | 0.0026 | 0.5783 | 0.00455 | 75.0 | 0.14 | 0.18 | 0.04 |
| | 3 | (B-3) | 1.49 | 0.10 | 0.08 | 0.07 | 0.09 | 0.0025 | 0.5789 | 0.00469 | 77.0 | 0.20 | 0.16 | −0.04 |
| | 4 | (B-4) | 1.49 | 0.10 | 0.09 | 0.08 | 0.09 | 0.0027 | 0.5789 | 0.00519 | 76.6 | 0.16 | 0.20 | 0.05 |
| | 5 | (B-5) | 1.54 | 0.07 | 0.08 | 0.08 | 0.07 | 0.0028 | 0.5791 | 0.00528 | 76.6 | 0.19 | 0.20 | 0.01 |
| Comparative Example | 1 | — | — | 0.30 | 0.32 | 0.32 | 0.31 | 0.0000 | 0.5764 | 0.00000 | 65.6 | 0.12 | 1.74 | 1.62 |
| | 2 | (B-7) | 1.52 | 0.26 | 0.20 | 0.16 | 0.21 | 0.0000 | 0.5753 | 0.00000 | 67.5 | 0.27 | 0.44 | 0.16 |
| | 3 | (B-8) | 1.39 | 0.09 | 0.07 | 0.08 | 0.08 | 0.0000 | 0.5775 | 0.00000 | 66.3 | 0.30 | 0.61 | 0.31 |
| | 4 | (B-9) | 1.46 | 0.28 | 0.25 | 0.25 | 0.26 | 0.0000 | 0.5775 | 0.00000 | 68.5 | 0.30 | 0.52 | 0.22 |
| | 5 | (B-10) | 1.32 | 0.26 | 0.24 | 0.23 | 0.24 | 0.0000 | 0.5740 | 0.00000 | 67.4 | 0.59 | 0.69 | 0.10 |
| | 6 | (B-11) | 1.35 | 0.26 | 0.22 | 0.21 | 0.23 | 0.0000 | 0.5761 | 0.00000 | 68.0 | 0.48 | 0.81 | 0.33 |
| | 7 | (B-12) | 1.71 | 0.29 | 0.26 | 0.29 | 0.28 | 0.0000 | 0.5744 | 0.00000 | 66.9 | 0.20 | 0.37 | 0.17 |
| | 8 | (B-13) | 1.58 | 0.37 | 0.34 | 0.33 | 0.34 | 0.0000 | 0.5736 | 0.00000 | 65.7 | 0.19 | 0.41 | 0.22 |
| | 9 | (B-14) | 1.78 | 0.33 | 0.32 | 0.30 | 0.32 | 0.0000 | 0.5713 | 0.00000 | 69.2 | 0.27 | 0.44 | 0.18 |
| | 10 | (B-15) | 1.54 | 0.36 | 0.33 | 0.34 | 0.34 | 0.0000 | 0.5757 | 0.00000 | 67.8 | 0.18 | 0.39 | 0.21 |
| | 11 | (B-16) | 1.69 | 0.33 | 0.32 | 0.31 | 0.32 | 0.0000 | 0.5788 | 0.00000 | 67.0 | 0.22 | 0.40 | 0.18 |
| | 12 | (B-17) | 1.66 | 0.33 | 0.32 | 0.33 | 0.33 | 0.0000 | 0.5740 | 0.00000 | 66.1 | 0.17 | 0.61 | 0.44 |

Since the molded products obtained in Examples 1 to 5 were made of the methacrylic-based resin composition including the fatty acid compound (B) and had an absorbance ratio P1/P2 of 0.0040 or more, the molded products obtained in Examples 1 to 5 were excellent in scratch resistance.

Since the molded product obtained in Comparative Example 1 did not include the fatty acid compound (B), the molded product obtained in Comparative Example 1 was inferior in scratch resistance.

Since the molded products obtained in Comparative Examples 2 to 12 had an absorbance ratio P1/P2 of less than 0.0040, the molded products obtained in Comparative Examples 2 to 12 were significantly inferior in scratch resistance.

Examples 6 to 11, Comparative Examples 13 to 14,
Comparative Examples 16 to 24

The operation was carried out in the same manner as in Example 1 except that the cylinder temperature of the injection molding machine was set to 280° C., the metal mold temperature was set to 40°, and the type of the fatty acid compound (B) was set as shown in Table 3, to obtain a pellet-shaped methacrylic-based resin composition. The evaluation results of the obtained methacrylic-based resin composition are shown in Table 4.

The content ratio of the fatty acid compound (B) in Table 4 indicates the content ratio (% by mass) of the fatty acid compound (B) to the total mass (100% by mass) of the methacrylic-based resin composition.

TABLE 3

| | | (Meth)acrylic-based polymer (A) | | Fatty acid compound (B) | | | | |
|---|---|---|---|---|---|---|---|---|
| | | Type | Blending amount (parts by mass) | Type | 10% weight-reduction temperature (° C.) | Melting point (° C.) | SP value (cal/cm³)^{1/2} | Blending amount (parts by mass) |
| Example | 6 | (A-1) | 100 | (B-1) | 243.2 | 103.0 | 9.86 | 2.0 |
| | 7 | (A-1) | 100 | (B-2) | 245.6 | 109.0 | 9.86 | 2.0 |
| | 8 | (A-1) | 100 | (B-3) | 241.5 | 101.0 | 9.86 | 2.0 |
| | 9 | (A-1) | 100 | (B-4) | 238.0 | 100.0 | 10.00 | 2.0 |
| | 10 | (A-1) | 100 | (B-5) | 219.5 | 111.0 | 10.54 | 2.0 |
| | 11 | (A-1) | 100 | (B-6) | 304.3 | 143.0 | 9.63 | 2.0 |
| Comparative Example | 13 | (A-1) | 100 | — | — | — | — | — |
| | 14 | (A-1) | 100 | (B-18) | 201.0 | 87.0 | 10.40 | 2.0 |
| | 16 | (A-1) | 100 | (B-9) | 339.4 | 95.0 | 9.00 | 2.0 |
| | 17 | (A-1) | 100 | (B-10) | 329.6 | 67.0 | 9.01 | 2.0 |
| | 18 | (A-1) | 100 | (B-11) | 335.5 | 72.0 | 9.01 | 2.0 |
| | 19 | (A-1) | 100 | (B-12) | 338.1 | 145.0 | 9.60 | 2.0 |
| | 20 | (A-1) | 100 | (B-13) | 343.7 | 119.0 | 9.63 | 2.0 |
| | 21 | (A-1) | 100 | (B-14) | 312.1 | 158.0 | 10.02 | 2.0 |
| | 22 | (A-1) | 100 | (B-15) | 385.0 | 110.0 | 9.53 | 2.0 |
| | 23 | (A-1) | 100 | (B-16) | 376.4 | 141.0 | 9.5 | 2.0 |
| | 24 | (A-1) | 100 | (B-17) | 383.4 | 135.0 | 10.6 | 2.0 |

TABLE 4

| | | Fatty acid compound (B) | | | | | | Total reflection measurement method | | | Water contact angle | Scratch resistance | | |
| | | Content | | Dynamic friction coefficient | | | | | | | | Before test | After test | After test |
| | | Type | ratio (% by mass) | n = 1 | n = 2 | n = 3 | Average | P1 | P2 | P1/P2 | Degree | (Haze) | (Haze) | (ΔHaze) |
|---|---|---|---|---|---|---|---|---|---|---|---|---|---|---|
| Example | 6 | (B-1) | 1.50 | 0.10 | 0.08 | 0.08 | 0.09 | 0.0043 | 0.5750 | 0.00748 | 79.1 | 0.22 | 0.22 | 0.00 |
| | 7 | (B-2) | 1.53 | 0.08 | 0.07 | 0.07 | 0.07 | 0.0042 | 0.5730 | 0.00733 | 77.9 | 0.24 | 0.24 | 0.00 |
| | 8 | (B-3) | 1.49 | 0.10 | 0.08 | 0.09 | 0.09 | 0.0061 | 0.5650 | 0.01080 | 82.3 | 0.22 | 0.24 | 0.02 |
| | 9 | (B-4) | 1.49 | 0.08 | 0.08 | 0.06 | 0.07 | 0.0069 | 0.5650 | 0.01221 | 81.1 | 0.28 | 0.30 | 0.02 |
| | 10 | (B-5) | 1.54 | 0.11 | 0.08 | 0.09 | 0.09 | 0.0056 | 0.5710 | 0.00981 | 80.5 | 0.24 | 0.24 | 0.01 |
| | 11 | (B-6) | 1.70 | 0.12 | 0.10 | 0.09 | 0.10 | 0.0024 | 0.5670 | 0.00423 | 73.6 | 0.24 | 0.26 | 0.02 |
| Comparative | 13 | — | — | 0.32 | 0.31 | 0.28 | 0.30 | 0.0000 | 0.5750 | 0.00000 | 66.7 | 0.11 | 0.90 | 0.79 |
| Example | 14 | (B-18) | 1.42 | 0.19 | 0.16 | 0.16 | 0.17 | 0.0000 | 0.5660 | 0.00000 | 66.2 | 0.30 | 0.36 | 0.06 |
| | 16 | (B-9) | 1.46 | 0.22 | 0.20 | 0.20 | 0.21 | 0.0000 | 0.5650 | 0.00000 | 71.9 | 0.41 | 0.49 | 0.08 |
| | 17 | (B-10) | 1.32 | 0.25 | 0.19 | 0.18 | 0.21 | 0.0000 | 0.5710 | 0.00000 | 73.0 | 0.68 | 0.93 | 0.25 |
| | 18 | (B-11) | 1.35 | 0.26 | 0.23 | 0.16 | 0.22 | 0.0000 | 0.5680 | 0.00000 | 72.2 | 0.46 | 0.68 | 0.22 |
| | 19 | (B-12) | 1.71 | 0.29 | 0.28 | 0.15 | 0.24 | 0.0000 | 0.5720 | 0.00000 | 70.9 | 0.25 | 0.56 | 0.31 |
| | 20 | (B-13) | 1.58 | 0.29 | 0.28 | 0.26 | 0.28 | 0.0000 | 0.5700 | 0.00000 | 65.6 | 0.23 | 0.75 | 0.53 |
| | 21 | (B-14) | 1.78 | 0.20 | 0.17 | 0.15 | 0.18 | 0.0000 | 0.5680 | 0.00000 | 74.7 | 0.35 | 0.66 | 0.31 |
| | 22 | (B-15) | 1.54 | 0.31 | 0.31 | 0.30 | 0.31 | 0.0000 | 0.5680 | 0.00000 | 67.1 | 0.29 | 0.57 | 0.28 |
| | 23 | (B-16) | 1.69 | 0.24 | 0.21 | 0.21 | 0.22 | 0.0000 | 0.5700 | 0.00000 | 68.6 | 0.42 | 0.56 | 0.14 |
| | 24 | (B-17) | 1.66 | 0.30 | 0.26 | 0.26 | 0.27 | 0.0000 | 0.5700 | 0.00000 | 66.9 | 0.33 | 0.67 | 0.34 |

The molded products obtained in Examples 6 to 11 were excellent in scratch resistance of the resin molded product.

In particular, in a case where the molded products obtained in Examples 6 to 10 were compared with the molded products obtained in Examples 1 to 5 corresponding to the molded products obtained in Examples 6 to 10, respectively, since the cylinder temperature of the injection molding machine was changed from 250° C. to 280° C., the value of the absorbance ratio P1/P2 was increased in each case, and the scratch resistance (ΔHaze) was more excellent.

Since the molded product obtained in Comparative Example 13 did not include the fatty acid compound (B), the molded product obtained in Comparative Example 13 was inferior in scratch resistance.

The molded products obtained in Comparative Examples 14 and 16 to 24 were inferior in scratch resistance since the absorbance ratio P1/P2 was less than 0.0040 even though the cylinder temperature of the injection molding machine was changed from 250° C. to 280° C.

Examples 12 to 14, Comparative Examples 25 to 27

The operation was carried out in the same manner as in Example 1 except that the cylinder temperature of the injection molding machine was set to 270° C., the metal mold temperature was set to 40°, and the type of the fatty acid compound (B) was set as shown in Table 5, to obtain a pellet-shaped methacrylic-based resin composition. The evaluation results of the obtained methacrylic-based resin composition are shown in Table 6.

Example 15

The operation was carried out in the same manner as in Example 12 except that the injection speed of the injection molding machine was set to 3.9 cm³/sec, to obtain a pellet-shaped methacrylic-based resin composition. The evaluation results of the obtained methacrylic-based resin composition are shown in Table 6.

Comparative Example 28

The operation was carried out in the same manner as in Example 2 except that the cylinder temperature of the injection molding machine was set to 230° C., and the metal mold temperature was set to 60°, to obtain a pellet-shaped methacrylic-based resin composition. The evaluation results of the obtained methacrylic-based resin composition are shown in Table 6.

The content ratio of the fatty acid compound (B) in Table 6 indicates the content ratio (% by mass) of the fatty acid compound (B) to the total mass (100% by mass) of the methacrylic-based resin composition.

TABLE 5

| | | (Meth)acrylic-based polymer (A) | | Fatty acid compound (B) | | | | |
| | | Type | Blending amount (parts by mass) | Type | 10% weight-reduction temperature (° C.) | Melting point (° C.) | SP value (cal/cm³)^{1/2} | Blending amount (parts by mass) |
|---|---|---|---|---|---|---|---|---|
| Example | 12 | (A-1) | 100 | (B-3) | 241.5 | 101.0 | 9.86 | 2.0 |
| | 13 | (A-1) | 100 | (B-4) | 238.0 | 100.0 | 10.00 | 2.0 |
| | 14 | (A-1) | 100 | (B-5) | 219.5 | 111.0 | 10.54 | 2.0 |

TABLE 5-continued

| | | (Meth)acrylic-based polymer (A) | | Fatty acid compound (B) | | | | |
| | | Type | Blending amount (parts by mass) | Type | 10% weight-reduction temperature (° C.) | Melting point (° C.) | SP value (cal/cm³)¹ᐟ² | Blending amount (parts by mass) |
|---|---|---|---|---|---|---|---|---|
| Comparative | 25 | (A-1) | 100 | (B-8) | 275.0 | 81.0 | 9.67 | 2.0 |
| Example | 26 | (A-1) | 100 | (B-18) | 201.0 | 87.0 | 10.40 | 2.0 |
| | 27 | (A-1) | 100 | (B-19) | 235.6 | 75.0 | 9.89 | 2.0 |
| Example 15 | | (A-1) | 100 | (B-3) | 241.5 | 101.0 | 9.86 | 2.0 |
| Comparative Example 28 | | (A-1) | 100 | (B-2) | 245.6 | 109.0 | 9.86 | 2.0 |

SP value unit: $(\text{cal}/\text{cm}^3)^{1/2}$

TABLE 6

| | | Fatty acid compound (B) | Content ratio (% by mass) | Dynamic friction coefficient | | | | Total reflection measurement method | | | Water contact angle | Scratch resistance | | |
| | | Type | mass | n = 1 | n = 2 | n = 3 | Average | P1 | P2 | P1/P2 | Degree | Before test (Haze) | After test (Haze) | After test (ΔHaze) |
|---|---|---|---|---|---|---|---|---|---|---|---|---|---|---|
| Example | 12 | (B-3) | 1.49 | 0.08 | 0.08 | 0.10 | 0.09 | 0.0038 | 0.5760 | 0.00660 | 81.5 | 0.22 | 0.24 | 0.02 |
| | 13 | (B-4) | 1.49 | 0.10 | 0.08 | 0.08 | 0.09 | 0.0045 | 0.5740 | 0.00784 | 80.1 | 0.28 | 0.29 | 0.01 |
| | 14 | (B-5) | 1.54 | 0.08 | 0.08 | 0.07 | 0.08 | 0.0042 | 0.5770 | 0.00728 | 80.6 | 0.26 | 0.27 | 0.01 |
| Comparative | 25 | (B-8) | 1.39 | 0.13 | 0.09 | 0.08 | 0.10 | 0.0000 | 0.5740 | 0.00000 | 72.9 | 0.25 | 0.41 | 0.16 |
| Example | 26 | (B-18) | 1.42 | 0.17 | 0.16 | 0.17 | 0.17 | 0.0000 | 0.5760 | 0.00000 | 66.2 | 0.30 | 0.45 | 0.15 |
| | 27 | (B-19) | 1.36 | 0.11 | 0.11 | 0.10 | 0.11 | 0.0000 | 0.5730 | 0.00000 | 66.7 | 0.42 | 0.59 | 0.17 |
| Example 15 | | (B-3) | 1.49 | 0.07 | 0.06 | 0.08 | 0.07 | 0.0164 | 0.5630 | 0.02913 | 82.3 | 0.33 | 0.33 | 0.00 |
| Comparative Example 28 | | (B-2) | 1.53 | 0.10 | 0.12 | 0.11 | 0.11 | 0.0014 | 0.5803 | 0.00241 | 71.2 | 0.14 | 0.24 | 0.10 |

The molded products obtained in Examples 12 to 15 were excellent in scratch resistance.

In particular, in a case where each of the molded products obtained in Examples 12 to 14 was compared with each the molded products obtained in Examples 3 to 5, since the cylinder temperature of the injection molding machine was changed from 250° C. to 270° C., the value of the absorbance ratio P1/P2 was increased in each case.

Furthermore, the molded product obtained in Example 15 was excellent in scratch resistance. In particular, as compared with the molded product obtained in Example 12, since the injection speed of the injection molding machine was changed from 23.3 cm³/sec to 3.89 cm³/sec, the value of the absorbance ratio P1/P2 was increased, and the obtained molded product was excellent in scratch resistance.

On the other hand, in a case where the molded product obtained in Comparative Example 28 was compared with the molded product obtained in Example 2, since the cylinder temperature of the injection molding machine was changed from 250° C. to 230° C., the value of the absorbance ratio P1/P2 was decreased, and the obtained molded product was inferior in scratch resistance.

The molded products obtained in Comparative Examples 25 to 27 were inferior in scratch resistance since the absorbance ratio P1/P2 was less than 0.0040 even through the cylinder temperature of the injection molding machine was changed from 250° C. to 270° C.

INDUSTRIAL APPLICABILITY

Since the resin molded product of the present invention is excellent in scratch resistance, the resin molded product is used as, for example, a material for housing equipment such as vanities, bathtubs, and flush toilets; building materials; vehicle members such as vehicle interior/exterior materials; and particularly, is suitably used as vehicle members.

Examples of the vehicle members include tail lamp covers, headlamp covers, meter panels, door mirror housings, pillar covers (sash covers), licensed garnishes, front grilles, fog garnishes, emblems, and among these, the resin molded product of the present invention is preferably used as tail lamp covers, headlamp covers, and meter panels.

Examples of the mobile phone member include a back plate of a mobile phone and a front plate of a display, and among these, the resin molded product of the present invention is preferably used as the back plate of a mobile phone.

REFERENCE SIGNS LIST

1: Test piece

2: Friction wear treatment portion

3: Center portion of test piece

4: Gate

The invention claimed is:

1. A method of producing a resin molded product, comprising:

performing injection molding on a methacrylic-based resin composition containing a (meth)acrylic-based polymer (A) and a saturated fatty acid amide compound (B) containing stearic acid amide and palmitic acid amide as main components, wherein the content ratio of the fatty acid compound (B) included in the methacrylic-based resin composition is 1.49% by mass or more and 10% by mass or less with respect to 100% by mass of the total mass of the methacrylic-based resin composition, wherein in the injection molding, the (meth)acrylic-based resin composition is injected from an injection molding machine with a cylinder temperature of 270° C. or higher and 300° C. or lower into a metal mold, and wherein the resin molded product has an absorbance ratio P1/P2 of a peak absorbance P1 in a wave number range of 1630 to 1650 cm$^{-1}$ to a peak absorbance P2 in a wave number range of 1710 to 1730 cm$^{-1}$ on a surface of the resin molded product, measured by a single reflection ATR surface reflection method with an infrared spectrophotometer, of 0.0066 or more.

2. The method of producing a resin molded product according to claim 1, wherein the cylinder temperature of the injection molding machine is 270° C. or higher and 295° C. or lower.

3. The method of producing a resin molded product according to claim 1, wherein the cylinder temperature of the injection molding machine is 270° C. or higher and 290° C. or lower.

4. The method of producing a resin molded product according to claim 1, wherein the methacrylic-based resin composition is injected into the metal mold whose metal mold temperature is set in advance to 35° C. or higher and 90° C. or lower.

5. The method of producing a resin molded product according to claim 1, wherein the methacrylic-based resin composition is injected into the metal mold whose metal mold temperature is set in advance to 36° C. or higher and 70° C. or lower.

6. The method of producing a resin molded product according to claim 1, wherein the methacrylic-based resin composition is injected into the metal mold whose metal mold temperature is set in advance to 37° C. or higher and 50° C. or lower.

7. The method of producing a resin molded product according to claim 1, wherein in the injection molding, an injection speed is 30 cm$^3$/sec or less.

8. The method of producing a resin molded product according to claim 1, wherein in the injection molding, an injection speed is 12 cm$^3$/sec or less.

9. The method of producing a resin molded product according to claim 1, wherein in the injection molding, an injection speed is 8 cm$^3$/sec or less.

10. The method of producing a resin molded product according to claim 1, wherein in the injection molding, an injection speed is 5 cm$^3$/sec or less.

11. The method of producing a resin molded product according to claim 1, wherein a 10% weight-reduction temperature of the fatty acid compound (B) is 308° C. or lower.

12. The method of producing a resin molded product according to claim 1, wherein the fatty acid compound (B) has a melting point of 90° C. or higher.

* * * * *